United States Patent
Yang et al.

(10) Patent No.: US 11,968,983 B2
(45) Date of Patent: Apr. 30, 2024

(54) TOBACCO LEAF FOLIAR SPRAYING SUBSTANCE AND METHOD FOR REDUCING HARMFUL INGREDIENTS IN CHEROOT AND TOBACCO SHREDS

(71) Applicant: Hubei Institute of Tobacco Science, Wuhan (CN)

(72) Inventors: Chunlei Yang, Wuhan (CN); Jinpeng Yang, Wuhan (CN); Jun Zhou, Wuhan (CN); Mei Yang, Wuhan (CN); Yong Yang, Wuhan (CN); Jun Yu, Wuhan (CN); Zongping Li, Wuhan (CN); Xiongfei Rao, Wuhan (CN); Guangjiong Qin, Wuhan (CN); Baoming Qiao, Wuhan (CN); Ruoshi Bai, Wuhan (CN); Yanjun Ma, Wuhan (CN); Xianbao Deng, Wuhan (CN); Wenzhang Qin, Wuhan (CN); Kaixiao Fan, Wuhan (CN); Candong Deng, Wuhan (CN); Yongle Wei, Wuhan (CN); Youlun Fan, Wuhan (CN)

(73) Assignee: HUBEI INSTITUTE OF TOBACCO SCIENCE, Wuhan (CN)

( * ) Notice: Subject to any disclaimer, the term of this patent is extended or adjusted under 35 U.S.C. 154(b) by 0 days.

(21) Appl. No.: 18/336,958

(22) Filed: Jun. 17, 2023

(65) Prior Publication Data
US 2023/0329246 A1 Oct. 19, 2023

(30) Foreign Application Priority Data
Aug. 29, 2022 (CN) .......................... 202211040095.0

(51) Int. Cl.
| | |
|---|---|
| *A01G 22/45* | (2018.01) |
| *A01N 25/04* | (2006.01) |
| *A01N 31/04* | (2006.01) |
| *A01N 31/16* | (2006.01) |
| *A01N 35/06* | (2006.01) |
| *A01N 43/90* | (2006.01) |
| *A01N 65/12* | (2009.01) |
| *A01N 65/20* | (2009.01) |
| *A01N 65/44* | (2009.01) |
| *A01P 21/00* | (2006.01) |

(52) U.S. Cl.
CPC ............. *A01N 65/20* (2013.01); *A01G 22/45* (2018.02); *A01N 25/04* (2013.01); *A01N 31/04* (2013.01); *A01N 31/16* (2013.01); *A01N 35/06* (2013.01); *A01N 43/90* (2013.01); *A01N 65/12* (2013.01); *A01N 65/44* (2013.01); *A01P 21/00* (2021.08)

(58) Field of Classification Search
CPC ........ A01N 65/20; A01N 25/04; A01N 31/04; A01N 31/16; A01N 35/06; A01N 65/44; A01N 65/00; A01N 43/14; A01N 43/16; A01N 65/08; A01G 22/45; A01G 7/06; A01P 21/00
See application file for complete search history.

(56) References Cited

FOREIGN PATENT DOCUMENTS

CN 104519759 A 4/2015

OTHER PUBLICATIONS

Isolation and Identification of Chemical Components in Lotus Leaf. Peng Shuang et al. Journal of Shenyang Pharmaceutical University, vol. 29, Issue 7, pp. 519-524.
Isolation and Identification of Chemical Components in Lotus Leaf (II). Ma Di et al. Journal of Shenyang Pharmaceutical University, vol. 31, Issue 5, pp. 355-359.
Isolation and Identification of Chemical Components in Lotus Leaf (III). Xia Minghui et al. Journal of Tianjin University of Traditional Chinese Medicine, vol. 34, Issue 2, pp. 96-99.
Effect of Irradiation on the Content of Tobacco Specific Nitrosamines in Cigarettes. Feng Min et al. Journal of Nuclear Agricultural Sciences, vol. 26, Issue 8, pp. 1137-1141.
CNIPA, Notification of First Office Action for Chinese application CN202211040095.0, Feb. 17, 2023.
CNIPA, Notification to grant patent right for Chinese application CN202211040095.0, Mar. 19, 2023.

*Primary Examiner* — Zohreh A Fay
(74) *Attorney, Agent, or Firm* — Zhigang Ma

(57) ABSTRACT

The present disclosure discloses a tobacco leaf foliar spraying substance for reducing harmful ingredients in cheroot, a method for reducing carcinogenic components in flue-cured tobacco leaves and flue-cured tobacco shreds. The tobacco leaf foliar spraying substance contains a lotus leaf extract, the harmful chemical ingredients comprise N-nitrosonornicotine, 4-(N-methyl-nitrosamine)-1-(3-pyridinyl)-1-butanone, N-nitrosoanabasine and N-nitrosoanatabine. Foliar spraying is performed on a fertile field by using the lotus leaf extract before tobacco leaves are harvested and modulated, which not only significantly promotesagronomic characters and economic traits of tobacco and alleviates tobacco leaf browning but also effectively reduces harmful chemical ingredients unique to tobacco leaves, such as nitrosamine and nicotine.

3 Claims, No Drawings

TOBACCO LEAF FOLIAR SPRAYING SUBSTANCE AND METHOD FOR REDUCING HARMFUL INGREDIENTS IN CHEROOT AND TOBACCO SHREDS

TECHNICAL FIELD

The present disclosure relates to the technical field of reduction of harmful ingredients in cheroot, in particular to a tobacco leaf foliar spraying substance and a method for reducing harmful ingredients in cheroot and tobacco shreds.

BACKGROUND

The quality of tobacco leaves depends on many factors such as soil, climates, variety, a cultivation technology and a baking technology. The flue-cured cigarettes generally contain nitrosamine (TSNAs), which has attracted attention due to its strong carcinogenic effect. It is a challenging issue for tobacco researchers to not only improve the smoking quality of cigarettes but also reduce the content of harmful ingredients from complex mainstream cigarette smoke. The results of relevant researches show that addition of some flavonoids that can block a nitrosation reaction in tobacco leaves can not only effectively reduce the content of nitrosamines in tobacco leaves, but also have the functions of clearing the throat, moistening the throat, relieving cough, etc., and can achieve the dual purposes of adding such the Chinese herbal medicines capable of not only playing a health care role but also reducing harmful ingredients of tobacco to cigarettes. For example, according to the Chinese pharmacopoeia, Chinese herbal medicines such as kudzu root, tangerine peel and *chrysanthemum* have good effects of clearing the throat, moistening the throat, and relieving cough, and can extract the active ingredients of these Chinese herbal medicines. However, these Chinese herbal medicines are complex components whose actions are not defined and which have a limited nitrosamine reducing effect. These valuable Chinese herbal medicines are expensive in price, which limits the production cost and yield of the baked cigarettes.

SUMMARY

In view of this, the objective of the present disclosure is to develop a method and product capable of effectively reducing nitrosamine component in flue-cured cigarettes and effectively decreasing the production cost of the flue-cured cigarettes.

Ina first aspect, the embodiments of the present disclosure disclose a tobacco leaf foliar spraying substance for reducing harmful ingredients in cheroot, where the tobacco leaf foliar spraying substance contains a lotus leaf extract, and the harmful chemical ingredients comprise N-nitrosonornicotine, 4-(N-methyl-nitrosamine)-1-(3-pyridinyl)-1-butanone, N-nitrosoanabasine and N-nitrosoanatabine.

In the embodiments of the present disclosure, the lotus leaf extract is prepared by using the following steps:

mashing freshly harvested lotus leaves and clear water in a mass ratio of 1:3 in a tissue masher, and then injecting the meshed mixed suspension into a cycle ultrasonic extraction machine for ultrasonic extraction, where parameters for ultrasonic extraction are as follows: an extraction temperature is a room temperature of 25±5° C., an ultrasonic power is 1000 W, a rotation speed is 1200 rpm, and extraction time (cycle duration) is 30 f 5 min; and after ultrasonic extraction, filtering, and diluting filtrate.

In the embodiments of the present disclosure, the lotus leaf extract comprises at least one of pinoresinol, epiterpineol, isolariciresinol, Lappaol F, ryegrass lactone, obacunone, 4,5-dihydroblumel A, 3-oxo-α-ionol and dehydrovomifoliol.

In the embodiments of the present disclosure, the tobacco leaf foliar spraying substance comprises the following components in percentage by weight: 0.001-0.04% of isolariciresinol, 0.001-0.03% of ryegrass lactone and 0.001-0.04% of obacunone.

In the embodiments of the present disclosure, the tobacco leaf foliar spraying substance comprises the following components in percentage by weight: 0.001-0.04% of 4,5-dihydroblumel A, 0.001-0.04% of 3-oxo-α-ionol and 0.001-0.03% of dehydrovomifoliol.

In the embodiments of the present disclosure, the tobacco leaf foliar spraying substance comprises the following components in percentage by weight: 0.001-0.02% of isolariciresinol, 0.001-0.01% of ryegrass lactone, 0.001-0.015% of obacunone, 0.001-0.02% of 4,5-dihydroblumel A, 0.001-0.025% of 3-oxo-α-ionol and 0.001-0.025% of dehydrovomifoliol.

In the embodiments of the present disclosure, the tobacco leaf foliar spraying substance comprises the following components in percentage by weight: 0.001-0.015% of pinoresinol, 0.001-0.01% of epiterpineol, 0.001-0.015% of isolariciresinol, 0.001-0.01% of ryegrass lactone, 0.001-0.015% of obacunone, 0.001-0.02% of 4,5-dihydroblumel A, 0.001-0.015% of 3-oxo-α-ionoland 0.001-0.001-0.015% of dehydrovomifoliol In the embodiments of the present disclosure, the tobacco leaf foliar spraying substance further comprises a reagent used for dissolving the lotus leaf extract and other accessories available for crop spraying.

In a second aspect, the embodiments of the present disclosure disclose flue-cured tobacco shreds prepared by spraying the tobacco leaf foliar spraying substance according to the first aspect, comprising no more than 556.95 ng/g of NNN, 4.15 ng/g of NNK, 299.52 ng/g of NAB and 65.78 ng/g of NAT.

In a third aspect, the embodiments of the present disclosure disclose a method for reducing carcinogenic ingredients in flue-cured tobacco leaves, comprising a step of spraying the tobacco leaf foliar spraying substance according to the first aspect 5 days before harvesting during the maturity period of tobacco leaves.

Compared with the prior art, the present disclosure at least has the following beneficial effects:

The embodiments of the present disclosure disclose that foliar spraying is performed for three times on a fertile field by using the lotus leaf extract before tobacco leaves are harvested and modulated, which not only significantly promotesagronomic characters and economic traits of tobacco and alleviates tobacco leaf browning but also effectively reduces harmful ingredients unique to tobacco leaves, such as nitrosamine and nicotine and increases the content of aroma components in tobacco leaves, thereby comprehensively promoting constant tobacco output value and quality; and also reduces the production cost of the roasted cigarettes, thereby achieving the recycling of lotus leaf resources.

DETAILED DESCRIPTION OF THE EMBODIMENTS

To make the purpose, technical solution and advantages of the present disclosure more understood, the present disclosure will be further described below in detail in combination with embodiments. It should be understood that specific embodiments described herein are only for explaining the present disclosure but not limiting the present disclosure.

I. Materials and Methods

1. Test Variety

The test was conducted in Hubei Tobacco Science Research Institute. The test material was flue-cured tobacco (*Nicotiana* tobacco L., Chuxue No. 14).

2. Seedlings and Soil Cultivation Period

Tobacco seeds were respectively sown in tobacco seedling trays (Zhejiang Bocheng New Materials Co., Ltd.), a substrate contained peat and frog stones in a weight ratio of 2:1, one seed per well. Seeding was conducted in a greenhouse via floating seedling cultivation under the natural light source of illumination. After sowing for 30 days, the seeds were transplanted to a culture pot filled with culture soil comprising a mixture of paddy soil and the substrate in a weight ratio of 5:2, and then grew in a field environment for 30 days.

3. Resettling Stage, Vigorous Growing Stage, Topping Stage and Maturation Stage

When the tobacco plants entered the resettling stage, the day when the $12^{th}$ tobacco leaf of the tobacco plant from bottom to top grew to 12 cm was recorded as 0d, and then the tobacco plants were transferred to an intelligent artificial climate room (Jiangxi Jinxian Lvjia Greenhouse Engineering Co., Ltd.) and cultured for 60 d at a controlled temperature of 18-25° C.

Photoperiod (day 14 h: 06:00-20:00, and night 10 h: 20:00-06:00): the relative humidity during the day and night was 65/55%, and the $CO_2$ concentration was 450 mmol. According to the trend of temperature changes during the day, dynamic temperature changes were set within the range of 18-25° C. Every other day, the tobacco plants were watered with 1 kg/plant under each treatment, and other managements were consistent with field management.

During the growth stages such as resettling stage, vigorous growing stage, budding stage, topping stage and maturation stage, common organic foliar fertilizers can be applied (purchased from Pingxiang Red Soil humic acid Co., Ltd.).

After entering the maturation stage of growth, the tobacco was conventionally harvested and air-cured, and cigarette raw materials can be obtained after flue-curing.

4. Foliar Spraying Solution

This experiment mainly studied the influence of a foliar spraying solution provided in the embodiments of the present disclosure on the quality of cigarette raw materials, agricultural characters of tobacco and disease incidence. The tobacco plants cultivated in the intelligent artificial climate chamber were divided into 10 groups, and different test sample solutions were used for spraying.

The test sample solution provided in the embodiments of the present disclosure includes a lotus leaf extract which was prepared using the following method:

freshly harvested lotus leaves and clear water were smashed in a mass ratio of 1:3 in a tissue masher, and then the meshed mixed suspension was injected into a cycle ultrasonic extraction machine for ultrasonic extraction, where parameters for ultrasonic extraction were as follows: an extraction temperature was a room temperature of 25±5° C., an ultrasonic power was 1000 W, a rotation speed was 1200 rpm, and extraction time (cycle duration) was 30 f 5 min; and after ultrasonic extraction, filtering was conducted, and the filtrate was diluted for 12 folds as a test sample 1.

After retrieving relevant literatures (Isolation And Identification of Chemical Components In Lotus Leaves [J], Journal of Shenyang Pharmaceutical University, July 2012; isolation and identification of chemical components in lotus leaves (III) [J], Journal of Tianjin University of Traditional Chinese Medicine, April 2015; Isolation and Identification of Chemical Constituents in Lotus Leaves (II) [J], Journal of Shenyang Pharmaceutical University, May 2014) it has found that the main components of the lotus leaf extract comprise pinoresinol (Shanghai Titan Technology Co., Ltd., CAS: 8006-39-1, purity: 95%+(GC)), epiterpineol (Shanghai Titan Technology Co., Ltd., purity: 95%+(GC)), isolariciresinol (Yunnan Xili Biotechnology Co., Ltd., CAS: 548-29-8, purity: 97.5%), neobaicalein II (Shanghai Yuanye Biotechnology Co., Ltd., CAS: 55084-08-7 Purity: HPLC≥98%), viscidulin III (Yunnan Xili Biotechnology Co., Ltd., CAS: 92519-91-0, purity: 98.0%), Lappaol F (Chengdu Bixiang Biotechnology Co., Ltd., CAS: 69394-17-8, purity: HPLC≥98%), ryegrass lactone (Sichuan Vicki Biotechnology Co., Ltd., CAS: 5989-02-6, Purity: HPLC≥98%), obacunone (Huaxia Chemistry, CAS: 751-03-0-1 Purity: 99% HPLC), 4,5-dihydroblumel A (Source leaf organism, CAS number: 155418-97-6, HPLC≥96%), 3-oxo-α-ionol (Sichuan Biotech Co., Ltd, CAS: 896107-70-3, purity: 98% HPLC) and dehydrovomifoliol (source leaf organism, CAS39763-33-2).

Therefore, the lotus leaf extract mentioned above and a bamboo leaf extract are used in this experiment to spray the tobacco plants in order to explore their influence on the quality of the tobacco plants and the finished tobacco product.

TABLE 1

| Test sample solution | Compositions and concentrations (mass percent) |
|---|---|
| Test sample 1 | Prepared by the above method |
| Test sample 2 | 0.0035% of isolariciresinol, 0.025% of ryegrass lactone and 0.040% of obacunone |
| Test sample 3 | 0.013% of pinoresinol, 0.007% of epiterpineol, 0.020% of isolariciresinol, 0.022% of Lappaol F, 0.009% of ryegrass lactone and 0.016% of obacunone |
| Test sample 4 | 0.04% of 4,5-dihydroblumel A, 0.035% of 3-oxo-α-ionol and 0.025% of dehydrovomifoliol |
| Test sample 5 | 0.01% of pinoresinol, 0.015% of epiterpineol, 0.03% of 4,5-dihydroblumel A, 0.025% of 3-oxo-α-ionol and 0.02% of dehydrovomifoliol |
| Test sample 6 | 0.015% of isolariciresinol, 0.008% of ryegrass lactone, 0.012% of obacunone, 0.018% of 4,5-dihydroblumel A, 0.025% of 3-oxo-α-ionol and 0.022% of dehydrovomifoliol |
| Test sample 7 | 0.013% of pinoresinol, 0.007% of epiterpineol, 0.015% of isolariciresinol, 0.008% of ryegrass lactone, 0.012% of obacunone, 0.018% of 4,5-dihydroblumel A, 0.014% of 3-oxo-α-ionol and 0.013% of dehydrovomifoliol |
| Test sample 8 | 0.065% of neobaicalein II and 0.035% of viscidulin III |

Therefore, in this experiment, the above test solutions were used to spray the tobacco during the planting process. Specific spraying situations are shown in Table 2.

TABLE 2

| Embodiments | Spraying schemes |
|---|---|
| Example 1 | Test sample 1 was sprayed 5 days before harvesting during the maturation stage |
| Example 2 | Test sample 2 was sprayed 5 days before harvesting during the maturation stage |
| Example 3 | Test sample 3 was sprayed 5 days before harvesting during the maturation stage |
| Example 4 | Test sample 4 was sprayed 5 days before harvesting during the maturation stage |
| Example 5 | Test sample 5 was sprayed 5 days before harvesting during the maturation stage |
| Example 6 | Test sample 6 was sprayed 5 days before harvesting during the maturation stage |
| Example 7 | Test sample 7 was sprayed 5 days before harvesting during the maturation stage |
| Comparative example 1 | Any of test samples 1-8 mentioned above was not sprayed |
| Comparative example 2 | Test sample 3 was sprayed during the resettling stage |
| Comparative example 3 | Test sample 3 was sprayed during the vigorous growing stage |
| Comparative example 4 | Test sample 3 was sprayed during the topping stage |
| Comparative example 5 | Test sample 8 was sprayed 5 days before harvesting during the maturation stage |

5. Investigation on Agronomic Characters of Tobacco Plants 10 tobacco plants were randomly selected from each treatment group of examples 1-7 and comparative examples 1-5 to be labeled. According to the standard YC/T 142-1998 "Tobacco Agronomic Character Investigation Method", the agronomic characters of tobacco during the resettling stage, topping stage and maturation stage were investigated at designated locations. The agronomic characters mainly include plant height, stem girth, and effective leaf area of tobacco plants. Leaf area (cm$^2$)=0.6345×leaf length (cm)× leaf width (cm).

6. Investigation on Incidence of Tobacco Bacterial Wilt Disease

For the characteristics of field diseases, an investigation was conducted on tobacco bacterial wilt disease. According to the national standard for classification of tobacco diseases and pests (GB/23222-2008), a 5-point sampling method was used, with 10 plants surveyed at each point and every 3 d. And the morbidity, disease index and relative prevention effect were calculated according to the formula.

Morbidity (%)=(number of diseased plants/total number of investigated plants)×100%

Disease index=[(Σ(number of disease plants)×number of disease level representatives/(total number of surveyed plants)×highest disease level value)×100%

The disease investigation shall refer to GB/23222-2008 "Classification and Investigation Methods for Tobacco Diseases and Pests" (based on individual plants): Level 0: the entire plant is disease-free; Level 1: occasional chlorotic spots on the stem, or withered leaves below half of the diseased side; Level 3: black streaks on the stem, but not exceeding half of the stem height, or withered leaves on the diseased side from half to two-thirds; Level 5: black streaks on the stem exceeding half of the stem height but not reaching the top of the stem, or more than two-thirds of the diseased leaves wither; Level 7: black stripes on the stem reach the top of the stem, or all the leaves of the diseased plant wither; Level 9: the diseased plant is basically dead.

7. Browning Characters of Flue-Cured Tobacco.

5 g of dried and smashed tobacco leaves were taken and placed in a 500 mL beaker. 250 mL of distilled water was added to conduct ultrasonic cleaning for 15 min, the tobacco leaves were filtered, and the filtrate was taken as a sample stock solution. During the measurement, the sample stock solution was diluted in an appropriate multiple, and the absorbance value was measured with a UV spectrophotometer at D420 nm, which was the browning degree.

8. TSNAs Content in Flue-Cured Tobacco

The contents of TSNAs in flue-cured tobacco were detected by using the following methods, including the contents of N-nitrosonomicotine, 4-(N-methyl-nitrosamine)-1-(3-pyridinyl)-1-butanone, N-nitrosoanabasine and N-nitrosoanatabine.

(1) Pretreatment of Samples

The flue-cured tobaccos prepared from examples 1-7 and comparative examples 1-5 were smashed respectively and then added into a PBS buffer solution to prepare a 25 mg/mL solution. After ultrasonic treatment for 1 h, the above solution was cooled and then centrifuged for 5 min at 5000 rpm, supernatant was taken and loaded to a diatomitechromatography column to perform standing absorption for 30 min, then the column was eluted with dichloromethane, eluent was collected and dried with anhydrous sodium sulfate, and then concentrated to 1 mL in a nitrogen atmosphere at 35° C. in a concentration instrument.

(2) Standard product: N-nitrosonornicotine (abbreviated as NNN, Beijing Bailingwei Technology Co., Ltd., CAS: 150824-47-8 purity: 95%), 4-(N-methyl-nitrosamine)-1-(3-pyridinyl)-1-butanone (NNK, Wuhan Fengtai Weiyuan Technology Co., Ltd., CAS number 64091-91-4 purity: 95%), N-nitrosoanabasine (NAB, Kaishi (Shanghai) Technology Co., Ltd., CAS: 1133-64-8 purity: 98%), and N-nitrosoanatabine (NAT Beijing Bailingwei Technology Co., Ltd., CAS: 887407-16-1, purity: 98%).

(3) Capillary gas chromatography detection: the Agilent gas chromatograph 6890 equipped with NPD was used for determination, and the capillary column was db-5, 30 m×0.32 mm×1 M, the injection temperature was 250° C., and the temperature was 280° C. The heating program was that an initial temperature of 50° C. was held for 4 min; the temperature was raised to 200° C. at 5° C./min and held for 4 min, the temperature was raised to 260° C. at 20° C./min and held for 20 min; the carrier gas flow rate was 3 mL/min, the auxiliary airflow rate was 20 mL/min, the hydrogen flow rate was 3 mL/min, the air flow rate was 120 mL/min, and the split ratio was 20:1, and the injection volume was 1 µL.

9. Sensory Quality of Flue-Cured Tobacco Leaves

Evaluation was conducted according to the "YC/T 530-2015 sensory evaluation method for the quality, style, and characteristics of flue-cured tobacco leaves".

10. Data Processing

All test data were expressed as mean and standard deviation, and SPSS 13.0 software was used to process the data, and multiple comparisons and significance differences were marked for each column of data II. Results

TABLE 3

| Embodiments | Plant height/cm | Leaf area/cm$^2$ | Stem girth/cm |
|---|---|---|---|
| Example 1 | 116.7 ± 5.7c | 1685 ± 105e | 8.4 ± 0.6c |
| Example 2 | 115.2 ± 6.2c | 1605 ± 176e | 8.2 ± 0.7c |
| Example 3 | 121.8 ± 4.5b | 1728 ± 134c | 9.4 ± 0.8b |
| Example 4 | 124.2 ± 3.7b | 1759 ± 127b | 9.8 ± 1.2a |

TABLE 3-continued

| Embodiments | Plant height/cm | Leaf area/cm² | Stem girth/cm |
|---|---|---|---|
| Example 5 | 119.4 ± 5.2bc | 1715 ± 106d | 9.1 ± 0.4b |
| Example 6 | 122.6 ± 4.4b | 1758 ± 92b | 9.5 ± 0.6b |
| Example 7 | 131.2 ± 5.3a | 1794 ± 137a | 10.2 ± 0.7a |
| Comparative example 1 | 92.6 ± 0.6d | 1325 ± 67f | 7.7 ± 0.3d |
| Comparative example 2 | 120.5 ± 6.2b | 1728 ± 125c | 9.5 ± 0.7b |
| Comparative example 3 | 120.3 ± 3.7b | 1729 ± U7c | 9.6 ± 0.5b |
| Comparative example 4 | 121.7 ± 4.3b | 1730 ± 121c | 9.8 ± 0.4b |
| Comparative example 5 | 121.5 ± 2.7b | 1728 ± 106c | 9.7 ± 0.6b |

The results of tobacco plant height, leaf area and stem girth after foliar spraying with the test solution provided in examples 1-7 and comparative examples 1-5 are presented in Table 2. From Table 2, it can be seen that compared to comparative example 1 in which foliar spraying is not conducted, the plant height, leaf area, and stem girth of examples 1-7 and comparative examples 2-5 have significantly increased, which indicates that foliar spraying of the lotus leaf extract, bamboo leaf extract, and related active ingredients provided in the embodiments of the present disclosure is beneficial for the growth of tobacco crops.

TABLE 4

| Embodiments | Morbidity | Disease index |
|---|---|---|
| Example 1 | 23.56 ± 0.32b | 8.18 ± 0.13b |
| Example 2 | 23.62 ± 0.24b | 8.22 ± 0.09b |
| Example 3 | 21.72 ± 0.34c | 8.05 ± 0.08c |
| Example 4 | 21.75 ± 0.43c | 8.02 ± 0.03c |
| Example 5 | 21.89 ± 0.32c | 8.12 ± 0.11bc |
| Example 6 | 21.82 ± 0.54c | 8.09 ± 0.07c |
| Example 7 | 20.78 ± 0.13d | 7.92 ± 0.08d |
| Comparative example 1 | 25.08 ± 0.27a | 8.37 ± 0.05a |
| Comparative example 2 | 21.73 ± 0.17c | 8.07 ± 0.07c |
| Comparative example 3 | 21.71 ± 0.08c | 8.05 ± 0.12c |
| Comparative example 4 | 21.68 ± 0.24c | 8.03 ± 0.06c |
| Comparative example 5 | 21.70 ± 0.16c | 8.04 ± 0.07c |

It can be seen from Table 4 that the morbidity and disease index of examples 1-7 and comparative examples 2-5 are significantly reduced compared with comparative example 1 in which foliar spraying is not conducted, which indicates that the foliar spraying of the lotus leaf extract, bamboo leaf extract and related active ingredients provided by the embodiment of the present disclosure is conducive to reducing the occurrence of tobacco crop diseases and pests.

TABLE 5

| Embodiment | 20° C. | 25° C. | 30° C. |
|---|---|---|---|
| Example 1 | 0.35 ± 0.08c | 0.41 ± 0.06b | 0.45 ± 0.04b |
| Example 2 | 0.34 ± 0.07c | 0.42 ± 0.07b | 0.47 ± 0.05b |
| Example 3 | 0.27 ± 0.04d | 0.36 ± 0.11c | 0.38 ± 0.05c |
| Example 4 | 0.28 ± 0.05d | 0.34 ± 0.09c | 0.36 ± 0.04c |
| Example 5 | 0.31 ± 0.06cd | 0.38i0.07c | 0.35 ± 0.06c |
| Example 6 | 0.29 ± 0.02d | 0.36 ± 0.04c | 0.37 ± 0.04c |
| Example 7 | 0.20 ± 0.05e | 0.29 ± 0.07d | 0.31 ± 0.05d |
| Comparative example 1 | 0.51 ± 0.08a | 0.57 ± 0.12a | 0.62 ± 0.07a |
| Comparative example 2 | 0.41 ± 0.06b | 0.53 ± 0.06a | 0.58 ± 0.06a |
| Comparative example 3 | 0.45 ± 0.02b | 0.52 ± 0.07a | 0.59 ± 0.04a |
| Comparative example 4 | 0.46 ± 0.08b | 0.54 ± 0.03a | 0.57 ± 0.07a |
| Comparative example 5 | 0.44 ± 0.05b | 0.53 ± 0.06a | 0.56 ± 0.05a |

The browning results of flue-cured cigarette raw materials after being aged for 5 months at 20° C., 25° C. and 30° C. after foliar spraying test sample solutions are sprayed to tobaccos in examples 1-7 and comparative examples 1-5 are present in Table 5. From Table 5, it can be seen that compared to comparative example 1 in which foliar spraying is not conducted, the browning degrees of flue-cured tobacco shreds prepared in examples 1-7 significantly decreased after aging for 5 months at 20° C., 25° C. and 30° C., which indicates that foliar spraying of the lotus leaf extract, bamboo leaf extract, and related active ingredients provided in the embodiments of the present disclosure is beneficial for reducing browning during the aging process of flue-cured tobacco.

In addition, it is found based on the results in Tables 3 and 4 that although the foliar spraying schemes provided by comparative examples 2-5 are beneficial for improving the agronomic traits of tobacco plants, it is not conducive to reducing the occurrence of aging and browning of cured tobacco raw materials at different temperatures.

TABLE 6

| Embodiments | NNN(ng/g) | NNK(ng/g) | NAB(ng/g) | NAT(ng/g) |
|---|---|---|---|---|
| Example 1 | 498.27 ± 58.73d | 3.94 ± 0.21d | 278.35 ± 21.17c | 59.74 ± 6.04c |
| Example 3 | 496.17 ± 43.12d | 3.92 ± 0.15d | 282.21 ± 16.23c | 57.85 ± 5.26c |
| Example 3 | 472.05 ± 26.74e | 3.13 ± 0.08ef | 213.08 ± 18.22d | 35.16 ± 4.57d |
| Example 4 | 465.13 ± 18.27e | 3.08 ± 0.12f | 211.12 ± 14.34d | 36.21 ± 5.11d |
| Example 5 | 476.82 ± 38.28e | 3.23 ± 0.20e | 216.27 ± 11.12d | 31.07 ± 4.54e |
| Example 6 | 474.28 ± 20.28e | 3.15 ± 0.14ef | 214.52 ± 9.32d | 29.25 ± 3.72e |
| Example 7 | 464.79 ± 15.32e | 3.02 ± 0.06f | 207.21 ± 13.14e | 28.73 ± 2.65e |
| Comparative example 1 | 686.79 ± 76.43a | 7.92 ± 0.25a | 312.61 ± 45.26a | 81.35 ± 5.15a |
| Comparative example 2 | 675.32 ± 28.84a | 7.59 ± 0.34a | 309.35 ± 41.64b | 78.32 ± 4.06b |
| Comparative example 3 | 637.84 ± 15.33b | 7.11 ± 0.06b | 304.53 ± 34.76b | 72.82 ± 3.42b |
| Comparative example 4 | 608.68 ± 42.17c | 6.74 ± 0.35c | 301.59 ± 26.43b | 68.43 ± 4.81b |
| Comparative example 5 | 597.43 ± 28.23c | 6.46 ± 0.21c | 297.83 ± 18.27b | 65.27 ± 2.57b |

The contents of NNN, NNK, NAB, and NAT in flue-cured cigarette raw materials after a foliar spraying test sample solution is sprayed on tobaccos in various examples 1-7 and comparative examples 1-5 are presented in Table 6. From Table 6, it can be seen that compared to comparative example 1 in which foliar spraying is not conducted, the contents of NNN, NNK, NAB and NAT in the flue-cured tobacco shreds prepared in examples 1-7 are significantly lower than those in comparative examples, which indicates that the lotus leaf extract, bamboo leaf extract and related active ingredients provided in the embodiments of the present disclosure are sprayed on the mature leaves, which is beneficial for reducing the content of TSNAs in flue-cured tobacco and providing help for preparing cigarettes with low carcinogenicity.

Therefore, based on the method provided by the above examples, the present disclosure also discloses flue-cured tobacco shreds including no more than 556.95 ng/g of NNN, 4.15 ng/g of NNK, 299.52 ng/g of NAB and 65.78 ng/g of NAT.

For this purpose, the present disclosure also evaluates the sensory quality of the flue-cured tobacco cut obtained from example 1 and the flue-cured tobacco cut obtained from Proportion 1, as shown in Table 7. Table 7 shows the sensory evaluation results of Example 1 and the tobacco cut obtained from comparative example 1, which are analyzed in accordance with the "Implementation Standard for Sensory Evaluation of Tobacco Products YC/T 415-2011"; Among them, the total score for sensory evaluation is 100 points, with 18 points for aroma quality, 16 points for aroma quantity, 16 points for impurities, 20 points for irritation, 22 points for aftertaste, 4 points for flammability, and 4 points for gray.

As shown in Table 7, the sensory evaluation quality of the flue-cured tobacco provided in example 1 is good, and the aroma quality and amount have been improved; however, by sensory evaluation, the flue-cured tobacco shreds provided by comparative example 1 has the worst quality, increased impurities, increased irritation and the worse aftertaste.

TABLE 7

| Embodiments | Quality feature Aroma quality | Aroma amount | Impurity gases | Stimulation | Aftertaste | Combustibility | Grey | Total | Stylistic characteristics Concentration | Energy |
|---|---|---|---|---|---|---|---|---|---|---|
| Example 1 | 13.00 | 13.00 | 13.50a | 16.00 | 16.50b | 4.00 | 4.00 | 78.50 | 3.00 | 3.00 |
| Comparative example 1 | 14.00b | 13.50 | 12.50b | 16.50 | 17.00a | 4.00 | 3.50 | 82.50 | 3.00 | 3.00 |

In summary, the present embodiment discloses the use of lotus leaf extract and/or bamboo leaf extract for three foliar sprays in the field before tobacco harvesting and modulation; not only does it significantly improve the agronomic traits and economic shape of tobacco, alleviate leaf browning, but it also effectively reduces harmful chemical components such as nitrosamines and nicotine, increases the aroma content of tobacco, and comprehensively improves the output value and quality of tobacco.

The above descriptions are only the preferred specific implementation modes of the present disclosure, but the scope of protection of the present disclosure is not limited thereto. Any changes or replacements that can be easily thought by those skilled in the art within the scope disclosed in the present disclosure should be included within the scope of protection of the present disclosure.

What is claimed is:

1. A method for reducing carcinogenic ingredients in flue-cured tobacco leaves, comprising a step of spraying a tobacco leaf foliar spraying substance, 5 days before harvesting during the tobacco leaf maturation stage;
wherein the tobacco leaf foliar spraying substance is for reducing harmful ingredients in cheroot, wherein the tobacco leaf foliar spraying substance comprises a lotus leaf extract, and the harmful chemical ingredients comprise N-nitrosonornicotine, 4-(N-methyl-nitrosamine)-1-(3-pyridinyl)-1-butanone, N-nitrosoanabasine and N-nitrosoanatabine, the lotus leaf extract is prepared by the following method:
mashing freshly harvested lotus leaves with clean water in a mass ratio of 1:3 in tissue masher, injecting the mixed suspension after mashing into a circular ultrasonic extraction machine, wherein operation parameters for ultrasonic extraction are as follows: an extraction temperature is room temperature of 25±5° C., ultrasonic power is 1000W, a rotation speed is 1200 rpm, and extraction time is 30±5 min; and then after ultrasonic treatment, filtering, and diluting filtrate,
wherein the tobacco leaf foliar spraying substance comprises the following components in percentage by weight: 0.001-0.04% of 4,5-dihydroblumel A, 0.001-0.04% of 3-oxo-α-inol and 0.001403% of dehydrovomifoliol, the harmful chemical ingredients comprise N-nitrosonornicotine, 4-(N-methyl-nitrosamine)-1-(3-pyridinyl)-1-butanone, N-nitrosoanabasine and N-nitrosoanatabine.

2. A method for reducing carcinogenic ingredients in flue-cured tobacco leaves, comprising a step of spraying a tobacco leaf foliar spraying substance, 5 days before harvesting during the tobacco leaf maturation stage;
wherein the tobacco leaf foliar spraying substance is for reducing harmful ingredients in cheroot, wherein the tobacco leaf foliar spraying substance comprises a lotus leaf extract, and the harmful chemical ingredients comprise N-nitrosonornicotine, 4-(N-methyl-nitrosamine)-1-(3-pyridinyl)-1-butanone, N-nitrosoanabasine and N-nitrosoanatabine, the lotus leaf extract is prepared by the following method:
mashing freshly harvested lotus leaves with clean water in a mass ratio of 1:3 in tissue masher, injecting the mixed suspension after mashing into a circular ultrasonic extraction machine, wherein operation parameters for ultrasonic extraction are as follows: an extraction temperature is room temperature of 25±5° C., ultrasonic power is 1000W, a rotation speed is 1200 rpm, and extraction time is 30±5 min; and then after ultrasonic treatment, filtering, and diluting filtrate,
wherein the tobacco leaf foliar spraying substance comprises the following components in percentage by weight: 0.001-0.02% of isolariciresinol, 0.001-0.01% of ryegrass lactone, 0.001-0.015% of obacunone, 0.001-0.02% of 4,5-dihydroblumel A, 0.001-0.025% of 3-oxo-α-ionol and 0.001-0.025% of dehydrovomifoliol.

3. A method for reducing carcinogenic ingredients in flue-cured tobacco leaves, comprising a step of spraying a tobacco leaf foliar spraying substance, 5 days before harvesting during the tobacco leaf maturation stage;
wherein the tobacco leaf foliar spraying substance is for reducing harmful ingredients in cheroot, wherein the tobacco leaf foliar spraying substance comprises a lotus leaf extract, and the harmful chemical ingredients comprise N-nitrosonornicotine, 4-(N-methyl-nitrosamine)-1-(3-pyridinyl)-1-butanone, N-nitrosoanabasine and N-nitrosoanatabine, the lotus leaf extract is prepared by the following method:
mashing freshly harvested lotus leaves with clean water in a mass ratio of 1:3 in tissue masher, injecting the mixed suspension after mashing into a circular ultrasonic extraction machine, wherein operation parameters for ultrasonic extraction are as follows: an extraction temperature is room temperature of 25±5° C., ultrasonic power is 1000W, a rotation speed is 1200 rpm, and extraction time is 30±5 min; and then after ultrasonic treatment, filtering, and diluting filtrate;
wherein the tobacco leaf foliar spraying substance comprises the following components in percentage by weight: 0.001-0.015% of pinoresinol, 0.001-0.01% of epiterpineol, 0.001-0.015% of isolariciresinol, 0.001-0.01% of ryegrass lactone, 0.001-0.015% of obacunone, 0.001-0.02% of 4,5-dihydroblumel A, 0.001-0.015% of 3-oxo-α-ionoland 0.001-0.015% of dehydrovomifoliol.

* * * * *